US011904626B2

(12) United States Patent
Depoi et al.

(10) Patent No.: US 11,904,626 B2
(45) Date of Patent: Feb. 20, 2024

(54) INTEGRATED ENVELOPE SEALER AND FLIP MODULE

(71) Applicant: DMT Solutions Global Corporation, Danbury, CT (US)

(72) Inventors: Arthur H. Depoi, Brookfield, CT (US); John Robert Masotta, Newtown, CT (US); Boris Rozenfeld, Danbury, CT (US); Daniel Wright, Danbury, CT (US); Anthony E. Yap, Palmyra, PA (US)

(73) Assignee: DMT Solutions Global Corporation, Danbury, CT (US)

( * ) Notice: Subject to any disclaimer, the term of this patent is extended or adjusted under 35 U.S.C. 154(b) by 0 days.

(21) Appl. No.: 17/550,479

(22) Filed: Dec. 14, 2021

(65) Prior Publication Data

US 2022/0097442 A1 Mar. 31, 2022

Related U.S. Application Data

(63) Continuation of application No. 16/799,715, filed on Feb. 24, 2020, now Pat. No. 11,230,139.

(51) Int. Cl.
*B43M 5/04* (2006.01)

(52) U.S. Cl.
CPC .................................. *B43M 5/042* (2013.01)

(58) Field of Classification Search
USPC .......................................................... 53/304
See application file for complete search history.

(56) References Cited

U.S. PATENT DOCUMENTS

| | | | | | |
|---|---|---|---|---|---|
| 4,010,598 | A * | 3/1977 | Mueller | B43M 5/042 53/378.3 |
| 4,403,981 | A | 9/1983 | Wuthrich | |
| 5,104,470 | A * | 4/1992 | Ritchie | B43M 5/042 156/227 |
| 5,475,968 | A | 12/1995 | Linder | |
| 5,800,119 | A | 9/1998 | Biggadike | |
| 6,038,835 | A | 3/2000 | de Haan et al. | |
| 6,300,971 | B1 | 10/2001 | Masotta et al. | |
| 6,783,594 | B2 | 8/2004 | Fairweather et al. | |
| 6,804,932 | B2 | 10/2004 | Joyce et al. | |

(Continued)

FOREIGN PATENT DOCUMENTS

GB 5464 4/1916

OTHER PUBLICATIONS

International Search Report and Written Opinion issued in International Application No. PCT/US2021/014532, dated Apr. 9, 2021 (14 pages).

*Primary Examiner* — Anna K Kinsaul
*Assistant Examiner* — Luis G Del Valle
(74) *Attorney, Agent, or Firm* — Brown Rudnick LLP; Matthew P. York

(57) ABSTRACT

An envelope sealing and flipping system can be incorporated into a mail inserter system to seal an envelope with a complete unbroken glue line and simultaneously flip the envelope face-up for downstream processing. The system includes a flip cage that receives an envelope and a moveable wetting brush that contacts the flap. The flip cage rotates, causing the flap to drag underneath the wetting brush, and realigning the envelope with a sealer nip which seals the envelope. The flip cage rotates continuously to receive, flip, and seal many envelopes.

12 Claims, 17 Drawing Sheets

(56) References Cited

U.S. PATENT DOCUMENTS

| | | | | |
|---|---|---|---|---|
| 6,808,594 | B2 | 10/2004 | Supron et al. | |
| 6,948,540 | B2 | 9/2005 | Brignell et al. | |
| 6,990,789 | B2 | 1/2006 | Riccardi | |
| 7,067,036 | B2 | 6/2006 | Beckstrom | |
| 7,425,244 | B2 | 9/2008 | Paradis et al. | |
| 8,109,063 | B2 | 2/2012 | Farmer | |
| 8,198,905 | B2 | 6/2012 | Sussmeier et al. | |
| 9,643,448 | B2 | 5/2017 | Ryan | |
| 2002/0060419 | A1 | 5/2002 | Stefan et al. | |
| 2004/0035528 | A1* | 2/2004 | Brignell | B43M 5/042 156/441.5 |
| 2004/0123571 | A1 | 7/2004 | Rozenfeld | |
| 2005/0067108 | A1* | 3/2005 | Beckstrom | B05C 1/0808 118/200 |
| 2007/0289702 | A1* | 12/2007 | Allen | B43M 5/042 156/227 |
| 2011/0057377 | A1 | 3/2011 | Sakata | |
| 2013/0225384 | A1 | 8/2013 | Yabune | |
| 2014/0034450 | A1* | 2/2014 | Demers | B65H 5/023 198/403 |
| 2016/0243882 | A1 | 8/2016 | Arthur et al. | |

* cited by examiner

INTEGRATED ENVELOPE SEALER AND FLIP MODULE

CROSS-REFERENCE TO RELATED APPLICATIONS

This is a continuation of U.S. patent application Ser. No. 16/799,715, filed on Feb. 24, 2020, the entire contents of which are incorporated herein by reference.

FIELD

The present disclosure relates generally to mail inserter systems, and more particularly to systems for sealing an envelope and flipping it into a face-up orientation.

BACKGROUND

Direct mail is an important tool for businesses to communicate with customers. In various mass mailing preparations, a mail package may include one or more documents, which may be folded and/or combined with cards or other inserts, all of which must be inserted into an envelope, which is sealed, addressed, and stamped for mailing.

To seal an envelope, typically the adhesive on the envelope flap is wetted, and then the flap is folded over to contact the body of the envelope, and the envelope may then need to be flipped over so that it is oriented with the address side facing up, to facilitate downstream operations such as metering and printing. The sealing process presents challenges for mail insertion systems because it involves wet adhesive that must not be allowed to contact the mechanical parts of the machine.

SUMMARY

The present disclosure provides systems and methods for sealing envelope. The disclosed systems can be incorporated into a modular mail inserter system to receive an envelope, seal it, and flip it over for downstream operations. As will become clear with respect to the description below and the related figures, the present disclosure addresses certain drawbacks associated with previously available envelope sealing and flipping applications.

For example, many previously known sealers that are present on high-speed production mail inserters require a 90-degree turn following the insertion module. The moistening brushes in these machines are typically narrow and stationary. The flap of the envelopes contacts the brush short side leading while the envelope is in motion. After the brush wets the flap, the flap is closed by an inline plow. This architecture takes up a relatively long length, adding machine footprint, and is more expensive because it requires the use of a 90 degree turn module.

In tabletop inserts, typical sealer architectures use a wide brush that is actuated up and down each cycle and contacts the entire flap at once after the body of the inserted envelope passes the brush area. To avoid contact with wet glue, the wide brush is split into shorter segments creating gaps between wet flap surfaces. The gaps allow spaces for nip rollers to transport the envelope to the flap-closing area without contacting the wet glue. The sealed flap thus contains interruptions in the glue line, and this type of sealing is considered unacceptable for production mail applications due to security and privacy reasons.

Following the sealing of the envelope, typically a separate module must be employed to flip the envelope face-up to facilitate downstream operations such as metering and printing. This adds additional space and cost to the mail inserter system.

The present disclosure addresses those and other problems by providing a compact module that seals an envelope with a complete unbroken glue line, without requiring a 90-degree turn module or an inline plow, and simultaneously flips the envelope face-up for downstream processing.

Systems and devices of the invention include a flip cage into which an envelope can be advanced. When the envelope enters a pair of nip rollers of the flip cage, the flap is face-up and aligned with a moveable wetting brush, which descends to contact the flap. The flip cage rotates to drag the flap underneath the brush, thereby wetting the entire adhesive portion of the flap. While the envelope is secured between the nip rollers, the rotating flip cage causes the flap to bear against a paper guide which bends the flap towards the body of the envelope until the flip cage has rotated 180 degrees and the envelope is face-up, at which point the crease of the envelope is aligned with a sealer nip. The nip rollers advance the envelope out of the flip cage, contacting the flap with another paper guide which bends the flap further towards the body of the envelope, before the envelope is drawn into the sealer nip, which presses the flap against the body, thereby sealing the envelope.

The flip cage is rotatable 360 degrees and it has a second pair of nip rollers positioned 180 degrees from the first pair of nip rollers, so that a second envelope can be advanced into the second pair of nip rollers as the first envelope is being drawn into the sealer nip. The flip cage can be rotated on a continuous loop, accepting and sealing one envelope after another in a continuous process that outputs sealed envelopes in a face-up orientation. The movement of the flip cage and the moveable wetting brush are controlled by a motion control processor that can be adjusted for different sizes or configurations of envelopes.

The disclosed envelope sealer module has a shortened machine footprint on account of combining sealing and flipping into a single process. The sealer also does not require a 90-degree turning module or an inline plow, which saves additional space. Sealers of the present invention allow more consistent application of water to the flap across the entire glue line, creating a more secure and reliable seal.

Another advantage of the disclosed module is that the water volume applied to the flap can be regulated by the moveable wetting brush controlled by a servomotor. The precise application of water by the brush provides enhanced sealing reliability without causing glue to contact the mechanical parts of the machine.

In certain aspects, the disclosure provides a method for sealing an envelope. The method involves receiving a body of an envelope face-down between a pair of nip rollers mounted to a frame. Receiving the envelope may involve rotating the nip rollers in a forward roll direction. The method further involves wetting a flap of the envelope to activate an adhesive substance thereon. Wetting the flap may involve lowering a moveable brush into contact with the flap portion prior to rotating the frame. The moveable brush may be loaded with water prior to contacting the flap. The method further involves rotating the frame with the body of the envelope secured between the nip rollers to flip the envelope face-up. When the frame is rotated, it causes the flap to slide underneath the brush, thereby wetting the flap. Rotating the frame also causes the flap to bear against a paper guide to form a bend between the flap and the body. The paper guide may be a semi-circular bearing surface or rail positioned beneath the frame. Finally the method involves drawing the bend into a sealer nip with the envelope face-up to press the adhesive substance against the body, to form a seal between the flap and the body of the envelope. Prior to drawing the bend of the envelope into the sealer nip, the body of the envelope may be advanced out from the nip rollers and towards the sealer nip by rotating the nip rollers in a reverse roll direction.

In some embodiments, the frame further includes a second pair of nip rollers substantially similar to the first pair of nip rollers and mounted opposite the first pair of nip rollers, such that the pairs of nip rollers are 180 degrees apart from each other about the frame's axis of rotation. The method may further involve receiving a second envelope with the second pair of nip rollers when the first envelope is drawn into the sealer nip, and performing the wetting, rotating, and drawing steps on the second envelope. The steps can thus be repeated on successive envelopes in a continuous loop.

In a related aspect, the disclosure provides systems for sealing one or more envelopes. The system includes a frame mounted to one or more gears configured to rotate the frame about an axis. The frame includes a first pair of nip rollers and a second pair of nip rollers located opposite the first pair of nip rollers. The frame may be configured such that one pair of nip rollers aligns with the envelope receiving area and the other pair of nip rollers aligns with the sealer nip. The system also includes an envelope receiving area configured to support an envelope and feed the envelope between one of the pairs of nip rollers. The envelope receiving area may include a feeding nip configured to advance the envelope into one of the two pairs of nip rollers. The system also includes a moveable brush located in the receiving area and configured to contact a flap of the envelope thereby to wet an adhesive on the flap when a body of the envelope has been received between one of the pairs of nip rollers. The system further includes a curvilinear paper guide located beneath the frame, configured to bear against the flap of the envelope as the frame rotates about the axis. The system further includes a sealer nip positioned opposite the envelope receiving area, configured to press the flap against the body of the envelope.

In some embodiments, the one or more gears are operably connected to a cage rotation motor, and the nip rollers are operably connected to a cage transport nips motor. The motors may be operated by a controller based on a programmable velocity profile. The velocity profile may be adjustable to accommodate different sizes of envelopes.

In some embodiments, the system includes a moistening pad, wherein the moveable brush is configured to assume a first position wherein the moveable brush contacts the moistening pad and a second position wherein the moveable brush is withdrawn from the moistening pad. The moveable brush may be positioned with respect to the flip cage such that the moveable brush is aligned with the flap of the envelope when the envelope is secured within one of the pairs of nip rollers. The moveable brush may thus be operable to wet the flap of the envelope when it is so aligned. In embodiments, the system includes a servomotor configured to control movement of the moveable brush.

BRIEF DESCRIPTION OF THE DRAWINGS

Features and advantages of the claimed subject matter will be apparent from the following detailed description of embodiments consistent therewith, which description should be considered with reference to the accompanying drawings.

FIGS. 4-12 show the envelope sealing and flipping station in various stages through the cycle of sealing and flipping an envelope, wherein FIG. 4 shows a mail piece being advanced into the flip cage with the flap open and trailing; FIG. 5 shows the mail piece fully advanced into the flip cage; FIG. 6 shows a moveable brush contacting the flap of the mail piece to moisten the glue line; FIG. 7 shows the mail piece over-ingested into the flip cage as the flip cage begins to rotate counterclockwise, thereby providing a constant flap velocity under the brush; FIG. 8 shows the flip cage rotated further counter-clockwise with the flap of mail piece entirely separated from the brush and the brush now in contact with the moistening pad to recharge with water for the next mail piece; FIG. 9 shows the flip cage rotated further counter-clockwise with the mail piece moved back out to its nominal crease-line position and the flap of the mail piece bent approximately 90 degrees by the lower paper guide; FIG. 10 shows the flip cage rotated 180 degrees to return to a horizontal position with the mail piece ready to exit the flip cage into the sealer nip and the brush moved back up to avoid contact with the body of a second mail piece entering the flip cage; FIG. 11 shows the mail piece exiting the flip cage, and a paper guide closing the flap before it enters the sealer nip; and FIG. 12 shows the mail piece having been sealed by the sealer nip and the second mail piece now staged and ready to begin its flip and seal cycle.

FIGS. 13-21 show various configurations and orientations of envelopes for use with the invention; wherein FIG. 13 shows a closed face-up envelope; FIG. 14 shows a closed face-down envelope; FIG. 15 shows an open face-down envelope; FIG. 16 shows a perspective view of an open face-down envelope; FIG. 17 shows a perspective view of a closed face-down envelope;

FIG. 18 shows a side view of an open face-down envelope; FIG. 19 shows a side view of an open face-down envelope with the flap bent at the crease line; FIG. 20 shows a side view of a face-up envelope with the flap bent at the crease line ready to be sealed; and FIG. 21 shows a face-up sealed envelope.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

The present disclosure provides a platform for sealing and flipping an envelope in a way that occupies a small footprint in a mail inserter system, compared with traditional sealing and flipping modules. Modules disclosed herein can be incorporated into a production mail inserter allowing the functions of sealing and flipping to be combined. Envelope sealers of the present disclosure can produce more secure and consistent seals that are compatible with the security and privacy standards of production mail applications, without getting wet glue onto the mechanical parts of the machine. The envelope sealer can be incorporated into modular inserter platforms, such as the RIVAL™ and EPIC™ inserter platforms available from BlueCrest Inc (Danbury, CT). Sealing apparatuses are known generally in the art, but the present disclosure provides advantages not envisioned in the prior art. Known sealing apparatuses include those described in U.S. Pat. Nos. 6,948,540 and 8,109,063, each of which is incorporated herein by reference.

In the disclosed invention, which can be integrated into a modular inserter platform, the functions of sealing and flipping are combined. Flipping an envelope to be face-up after insertion is required to facilitate downstream operations such as metering and printing. The inserted envelope flap is wet by a wide moveable brush that spans the width of the widest envelope without any gaps. The brush is actuated to wet only the flap. While the flap is being wetted by the brush, the main body of the envelope is drawn into a set of cage nips that are resident in a flip cage, which will be described in greater detail below. The flip cage has a horizontal axis of rotation positioned 90 degrees to the paper path and it carries two sets of nip rollers located in opposite sides of the flip cage.

Figure 1:
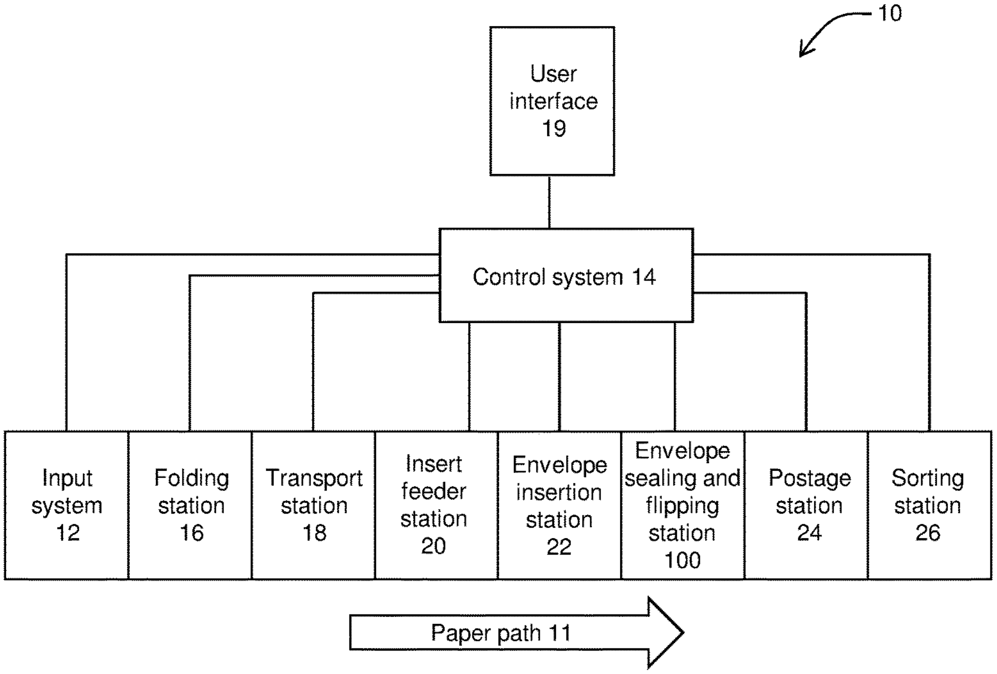
FIG. 1 is a block diagram schematic of a document inserting system including an envelope sealing and flipping station.

FIG. 1 shows a schematic block diagram of an example document inserting system that can incorporate the sealing devices of the present invention. The document inserting system 10 includes several stations or modules, including an envelope sealing and flipping station 100. The document insertion system 10 is illustrative and many other configurations may be utilized.

System 10 includes an input system 12 that feeds paper sheets from a paper web to an accumulating station that accumulates the sheets of paper in collation packets. Preferably, only a single sheet of a collation is coded (the control document), which coded information can be one input into the control system 14. The control system includes a processor configured to execute instructions that control the processing of documents in the various stations of the mass mailing inserter system 10.

A user interface 19 for controlling one or more user inputs and displaying one or more outputs from the system, allowing a user to interact with and control the operation of the system, can be physically connected to the system or can be located remotely. The user interface 19 can include a screen such as a touchscreen configured to display operating conditions and parameters of the inserter system 10 to a user. The user interface 19 can include other input devices such as a keyboard/keypad or a mouse. Implementation of the user interface 19 and control system 14 using computer hardware and software will be described in greater detail below with respect to FIG. 24.

Input system 12 feeds sheets in a paper path, as indicated by arrow 11 along what is known as the main deck of inserter system 10. After sheets are accumulated into collations by input system 12, the collations are folded in folding station 16 and the folded collations are then conveyed to a transport station 18, preferably operative to perform buffering operations for maintaining a proper timing scheme for the processing of documents in insertion system 10.

Each sheet collation is fed from transport station 18 to insert feeder station 20. It is to be appreciated that an inserter system 10 may include a plurality of feeder stations, but for clarity, only a single insert feeder 20 is shown. Insert feeder station 20 is operational to convey an insert (e.g., an advertisement) from a supply tray to the main deck of inserter system 10 so as to be combined with the sheet collation conveying along the main deck. The sheet collation along with the nested insert(s) are next conveyed into envelope insertion station 22 that is operative to open the envelope and insert the collation into the opening of the envelope.

The envelope is then conveyed to the envelope sealing and flipping station 100, which will be described in greater detail below. The sealing and flipping station is operable to wet the adhesive substance on the flap of the envelope, rotate the envelope into a face-up orientation, and seal the envelope by pressing the flap against the body of the envelope.

The envelope is then conveyed to postage station 24. Finally, the envelope is conveyed to sorting station 26 that sorts the envelopes.

Figure 2:
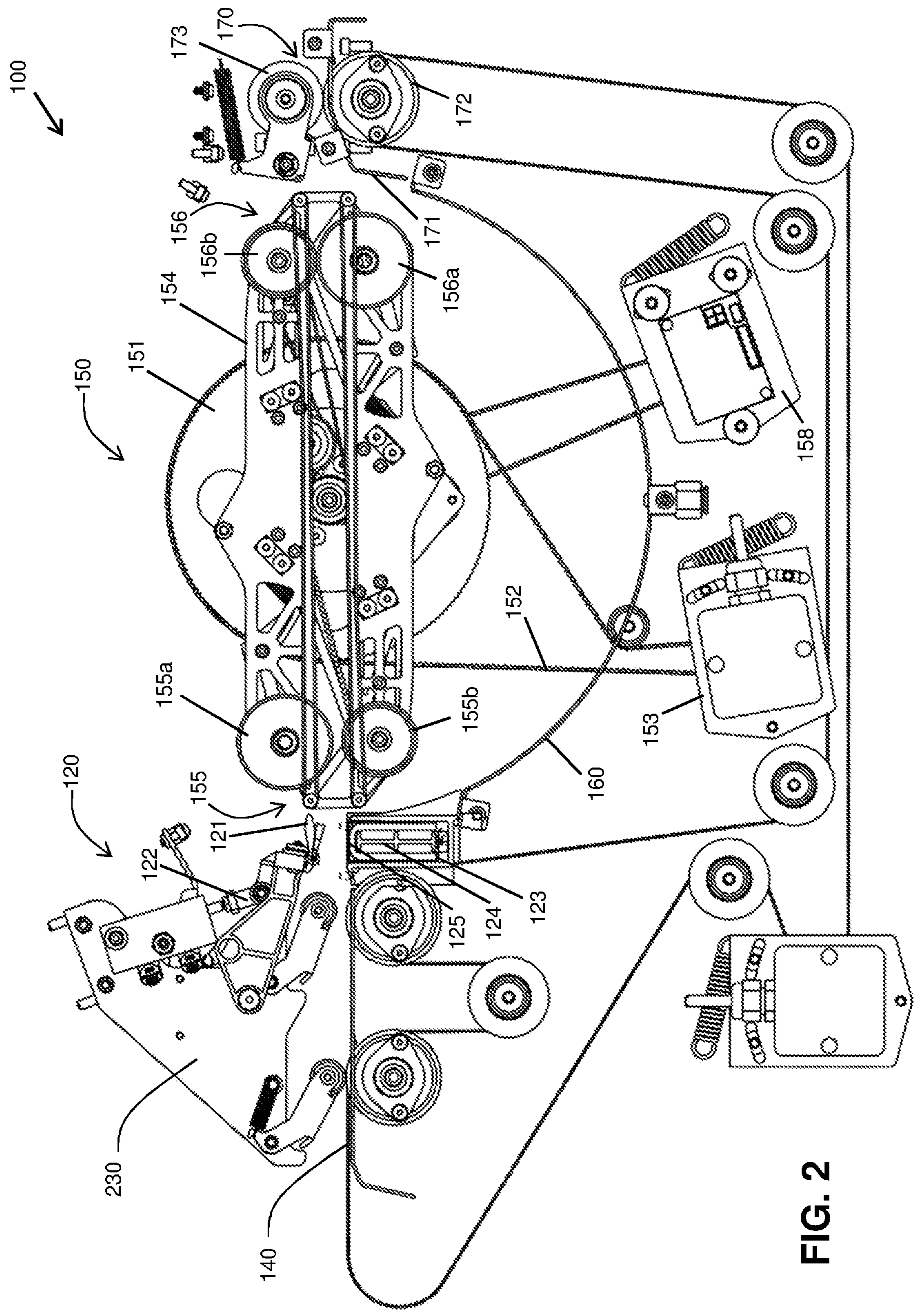
FIG. 2 shows a side cross-section view of an envelope sealing and flipping station.
Figure 3:
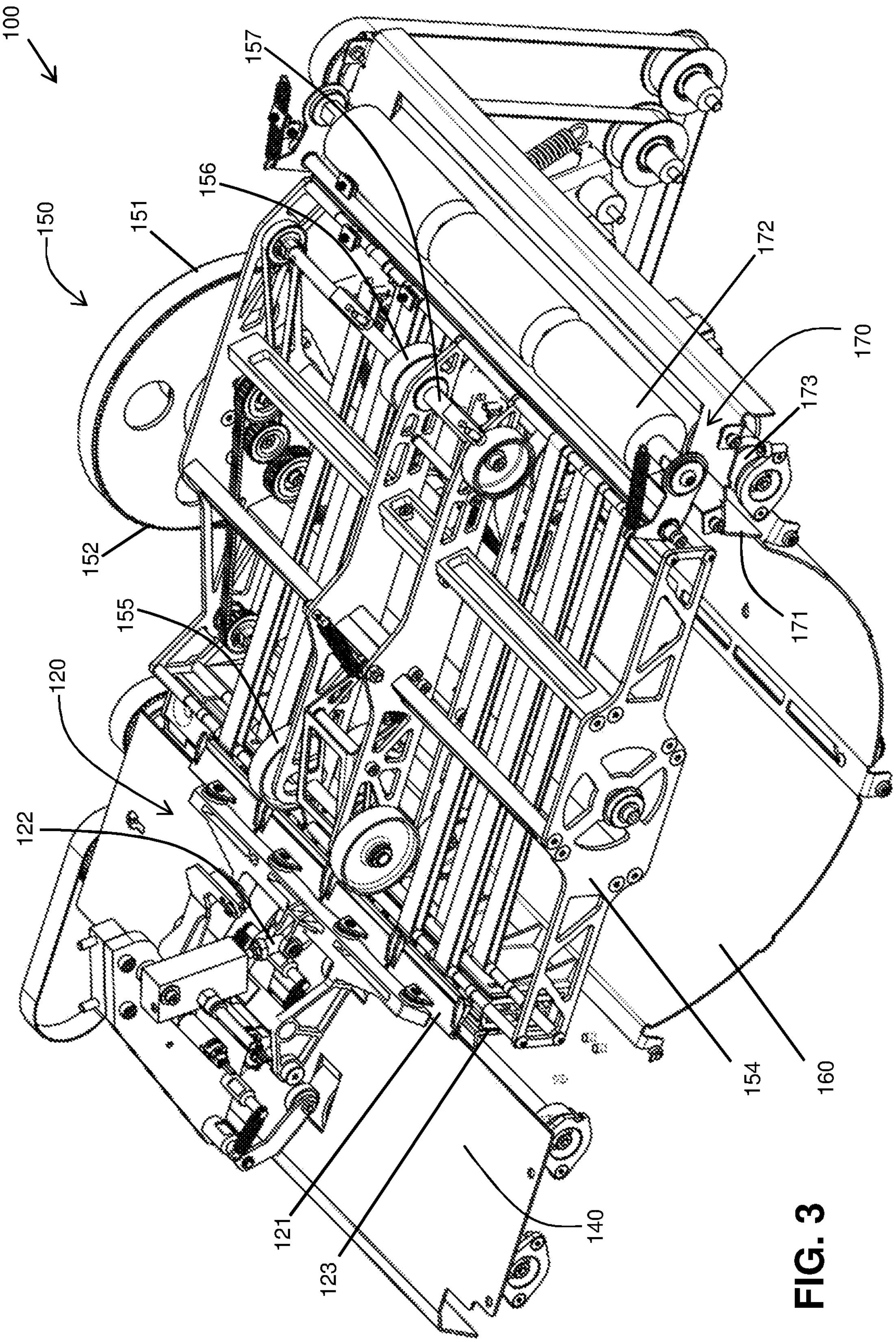
FIG. 3 shows a perspective view of an envelope sealing and flipping station.

An envelope sealing and flipping station 100 is shown in a side cross-section in FIG. 2, and a perspective view is shown in FIG. 3.

The envelope sealing and flipping station 100 includes a flip cage 150 which has a rigid frame 154 mounted to one or more gears 151 configured to rotate 360 degrees by the motion of a belt 152 under the control of a cage rotation motor 153. The rigid frame 154 has a first set of nip rollers 155 and a second set of nip rollers 156 mounted at either end of the rigid frame 154. The first set of nip rollers 155 includes two rollers **155*a* and 155*b*, and the second set of nip rollers 156 includes two rollers 156*a* and 156*b*, each set configured to receive an envelope therebetween. As shown in FIG. 3, multiple roller members operate in tandem around a single axle 157, but in the present description, the multiple roller members on the same axle will be referred to as one roller. It should be understood that a roller may include any number of roller members, such as 1, 2, 3, 4, 5, 10, or 20. Each set of nip rollers is configured to receive an envelope in a nip formed at the interface of the two rollers. Nip rollers are controlled by a cage transport nips motor 158** according to a motion profile which will be discussed below.

Upstream of the flip cage in the paper path is the envelope receiving area 140, which supports an envelope as it is received from upstream processing modules of an inserter system. The envelope receiving area 140 may include one or more transport rollers for moving the envelope towards the flip cage. Integrated with the envelope receiving area 140 is the wetting station 120 which includes a brush assembly 230 including a moveable brush 121 attached to an actuation arm 122. The moveable brush 121 is configured to contact a flap of an envelope that has been advanced between one of the pairs of nip rollers. The moveable brush 121 is sized to contact the entire length of the glue line on an envelope flap to enable a complete seal to be achieved. The actuation arm 122 is operable to move the moveable brush into a first position where the moveable brush is raised so as to allow the envelope to pass underneath without contacting the brush; and a second position where the moveable brush is lowered to contact the envelope. Beneath the moveable brush 121 is a water reservoir 123 with a moistening wick 124 for drawing water to a moistening pad 125. Moistening systems including fluid reservoirs and wicks are described in U.S. Pat. Nos. 6,783,594; 6,808,594; 6,990,789; 7,067,036; 7,425,244; 8,198,905; and 9,643,448; each of which is incorporated herein by reference. The moveable brush 121 is operable to move up and down to collect water from the moistening pad 125 and apply it to an envelope flap, under the operation of servomotor, as will be described in greater detail below, with respect to FIG. 23.

After the moveable brush 121 contacts the envelope flap, the flip cage 150 rotates counter-clockwise to drag the envelope flap underneath the moveable brush 121 to cause the water to be applied evenly to the flap, thus wetting the glue line as the envelope is pulled out from under the moveable brush.

The envelope sealing and flipping station 100 also includes a semi-circular paper guide 160. The paper guide 160 is positioned just outside the radius of the flip cage such that the envelope flap bears against it as the flip cage 150 rotates, which causes the flap to bend.

Just downstream of the flip cage in the paper path is the sealer nip 170 formed at the interface of compression rollers 172 and 173, which is configured to receive the envelope to seal the flap against the body of the envelope after the flip cage has rotated 180 degrees to align the envelope with the wetted flap with the sealer nip 170. A paper guide 171 is positioned below the sealer nip and is operable to close the flap against the body of the envelope as the envelope enters the sealer nip 170. Sealer nips formed by upper and lower rollers are known in the art, and are described for example in U.S. Pat. No. 6,804,932, incorporated herein by reference.

The coordinated operation of the various components of the envelope sealing and flipping station 100 will now be described with reference to FIGS. 4-12 and complemented with a timing diagram shown in FIG. 22. The mail piece described below may include one or more documents, cards, and/or inserts contained within an envelope. The general operation of the envelope sealing and flipping station will be the same regardless of the contents of the envelope.

Figure 22:
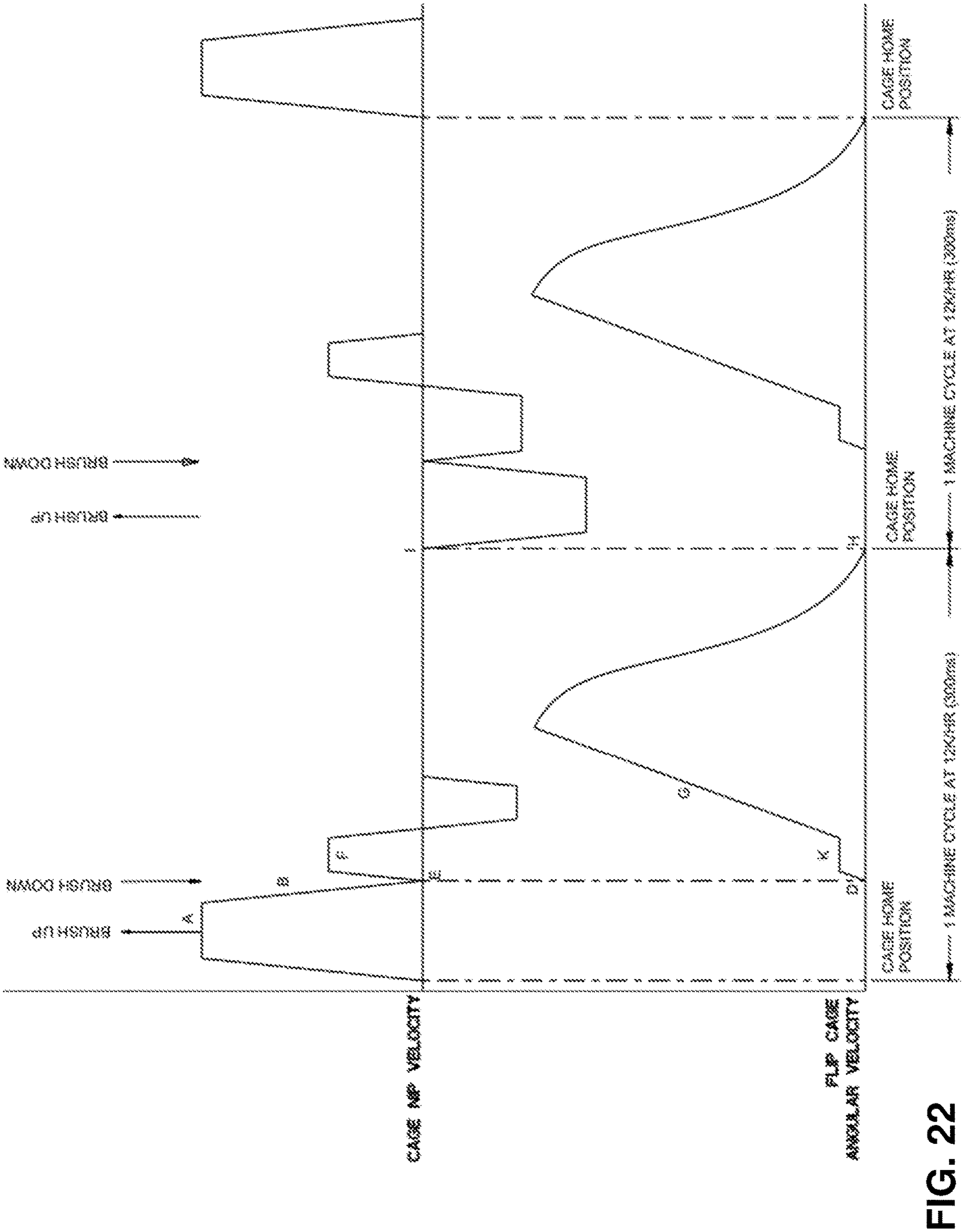
FIG. 22 shows a timing diagram and associated mechanism velocity profiles for an entire machine cycle.

FIG. 22 shows velocity profiles for both the cage nips and flip cage axes and the position changes of the moveable brush for two entire machine cycles with time as the x-axis. Beginning with FIG. 4, the flip cage 150 is in its nominal "home" position where it is oriented horizontally, with its two sets of nip rollers 155 and 156 at either side. In this position, a mail piece 1000 comprising an envelope 1001 having an envelope body 1002 and a flap 1003 is drawn into the flip cage with the flap 1003 open and trailing. When the envelope 1001 arrives at the flip cage 150, the linear velocity of the nip rollers 155*a* and 155*b* matches the velocity of the upstream sealer transport and the velocity is shown in the timing diagram in FIG. 22 at location A.

Figure 5:
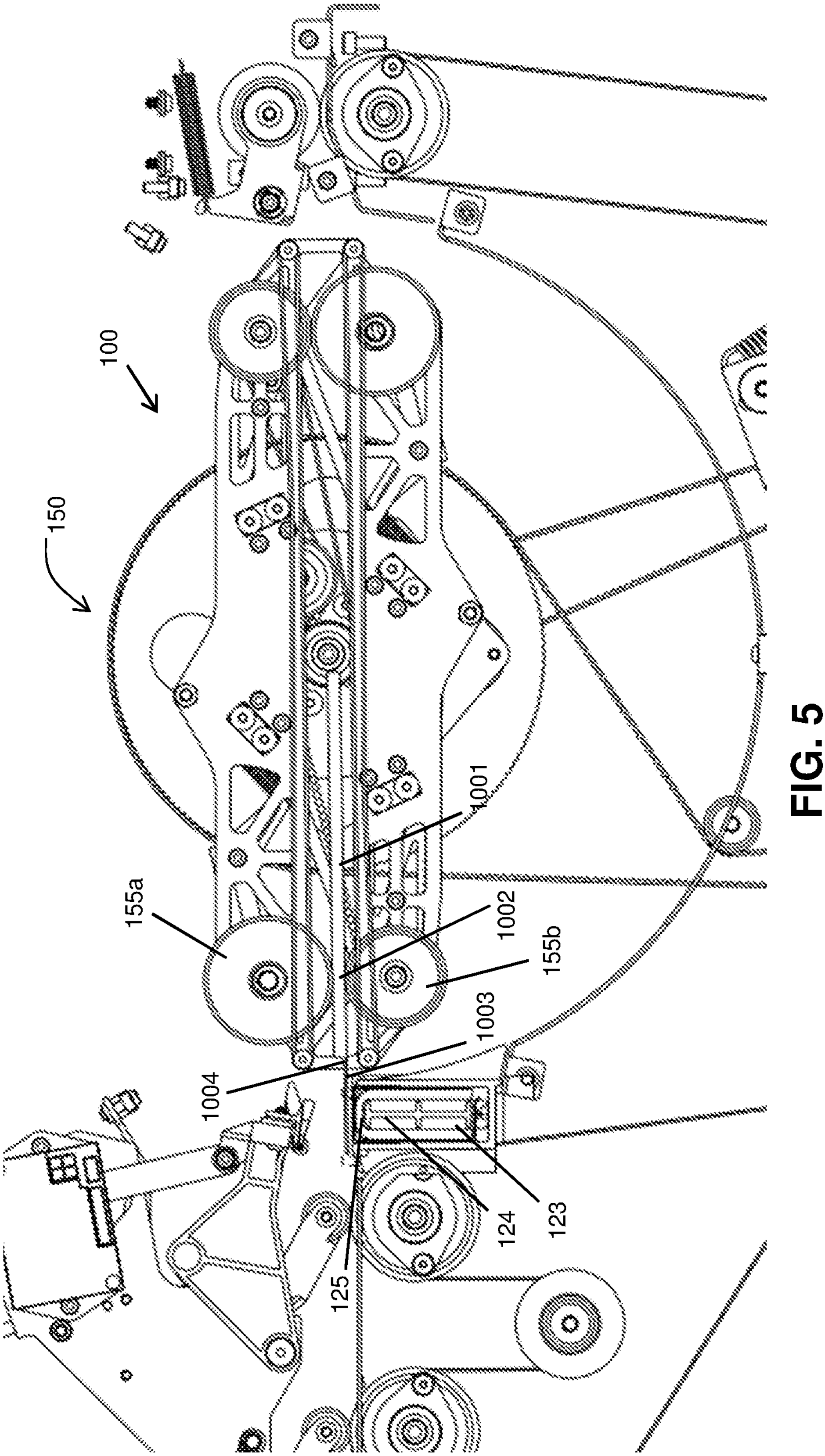

As shown in FIG. 5, mail piece 1000 has been fully received within the flip cage 150. After the nip rollers 155*a* and 155*b* get full control of the envelope 1001, they decelerate and stop the envelope 1001, positioning its crease line 1004 (at the interface between the flap 1003 and the body 1002) at the edge of the flip cage 150 leaving the flap 1003 outside of the flip cage 150 resting on the grate of the water reservoir 123. The deceleration to rest is shown in FIG. 22 at location B. The moveable brush 121 is positioned above the moistening pad 125 connected to the moistening wick 124 located in the water reservoir 123, which is located below the horizontal paper path.

Figure 6:
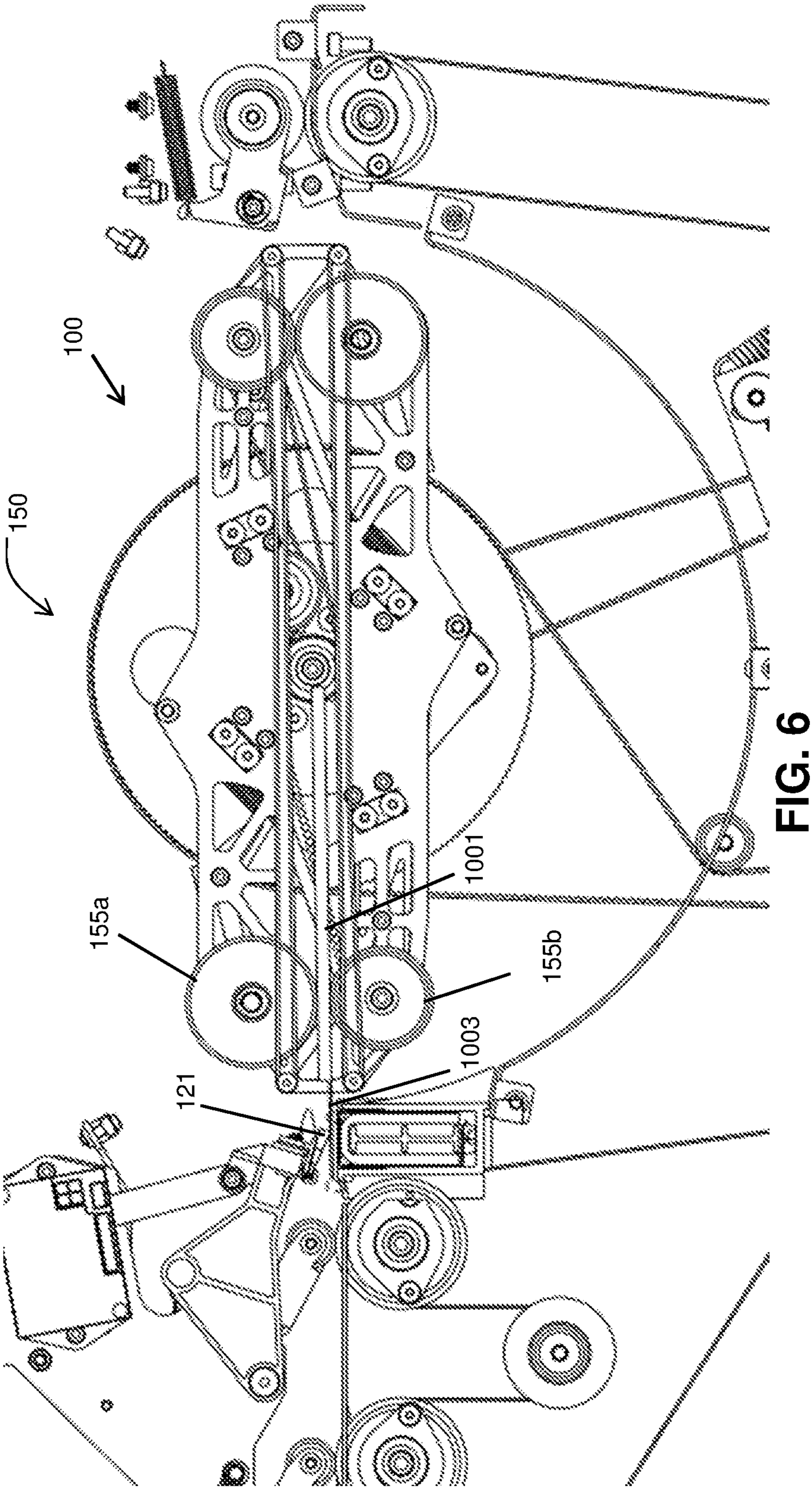
Figure 7:
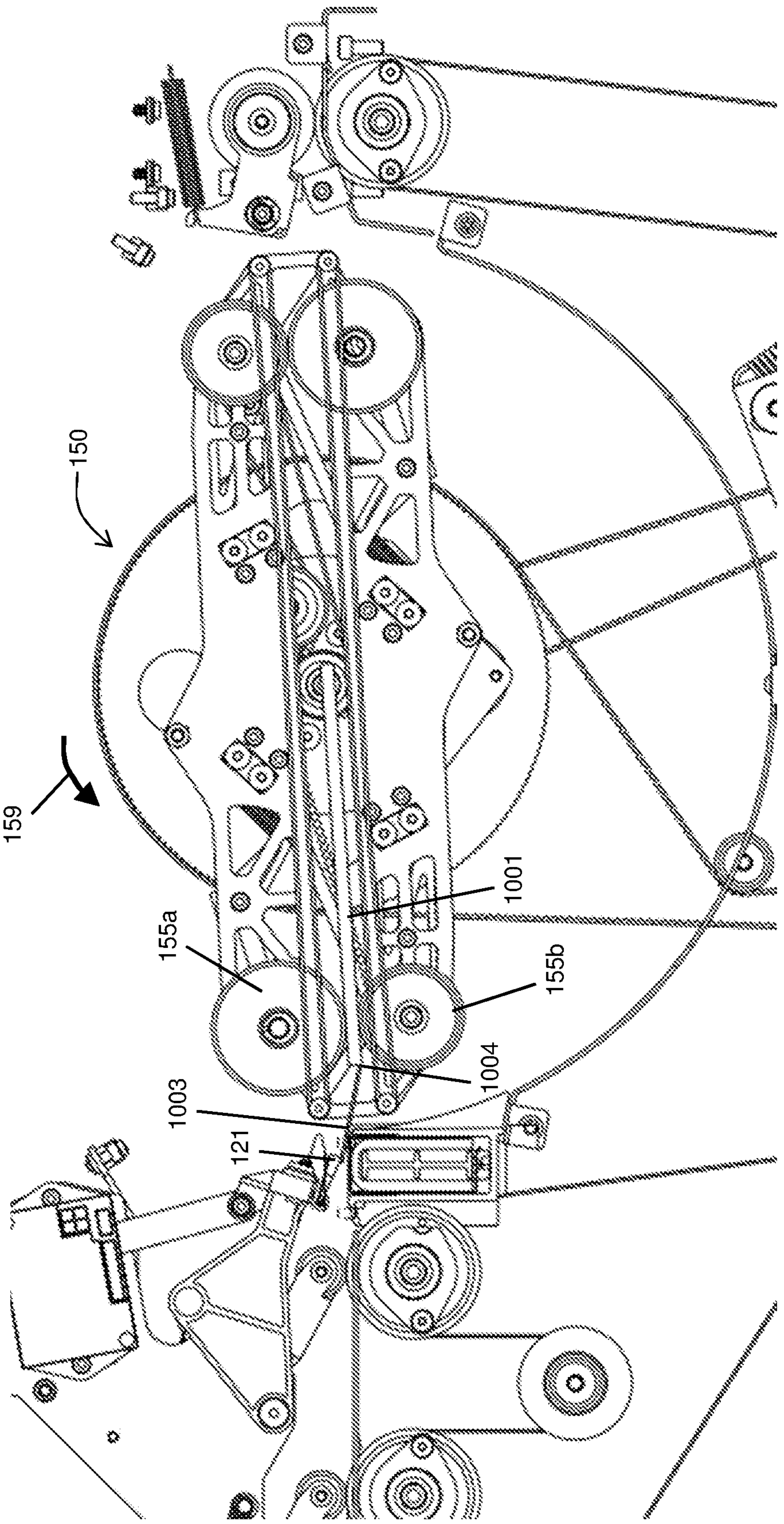

The moveable brush 121 can be actuated up and down. As shown in FIG. 6, the moveable brush 121 is actuated down, coming into contact with the flap 1003 of the envelope 1001. The completed actuated brush down motion is shown in FIG. 22 at location C. After the moveable brush 121 contacts the flap 1003, the flip cage 150 begins to rotate counter-clockwise (as shown by arrow 159) and the roller nips 155*a* and 155*b* begin rotating, as shown in FIG. 7, to move the mail piece further into the flip cage 150 so that the crease 1004 is almost within the nip of nip rollers 155*a* and 155*b*. Commencing motions of the flip cage and nip rollers are shown in FIG. 22 at locations D and E, respectively. The action of drawing the envelope 1001 further into the flip cage 150 and rotating the flip cage causes the flap 1003 to begin to be dragged out from underneath the moveable brush 121. Both the flip cage motion and the linear motion of envelope 1001 work together to provide a constant flap velocity under the brush. The roller nips 155*a* and 155*b* move the envelope deeper into the flip cage 150 as the flip cage commences a rotation and subsequently undoes this motion after the flaps has left the brush. These motions are shown in FIG. 22 as trapezoidal motion profiles at locations F and G. This motion will be described in greater detail below.

Figure 8:
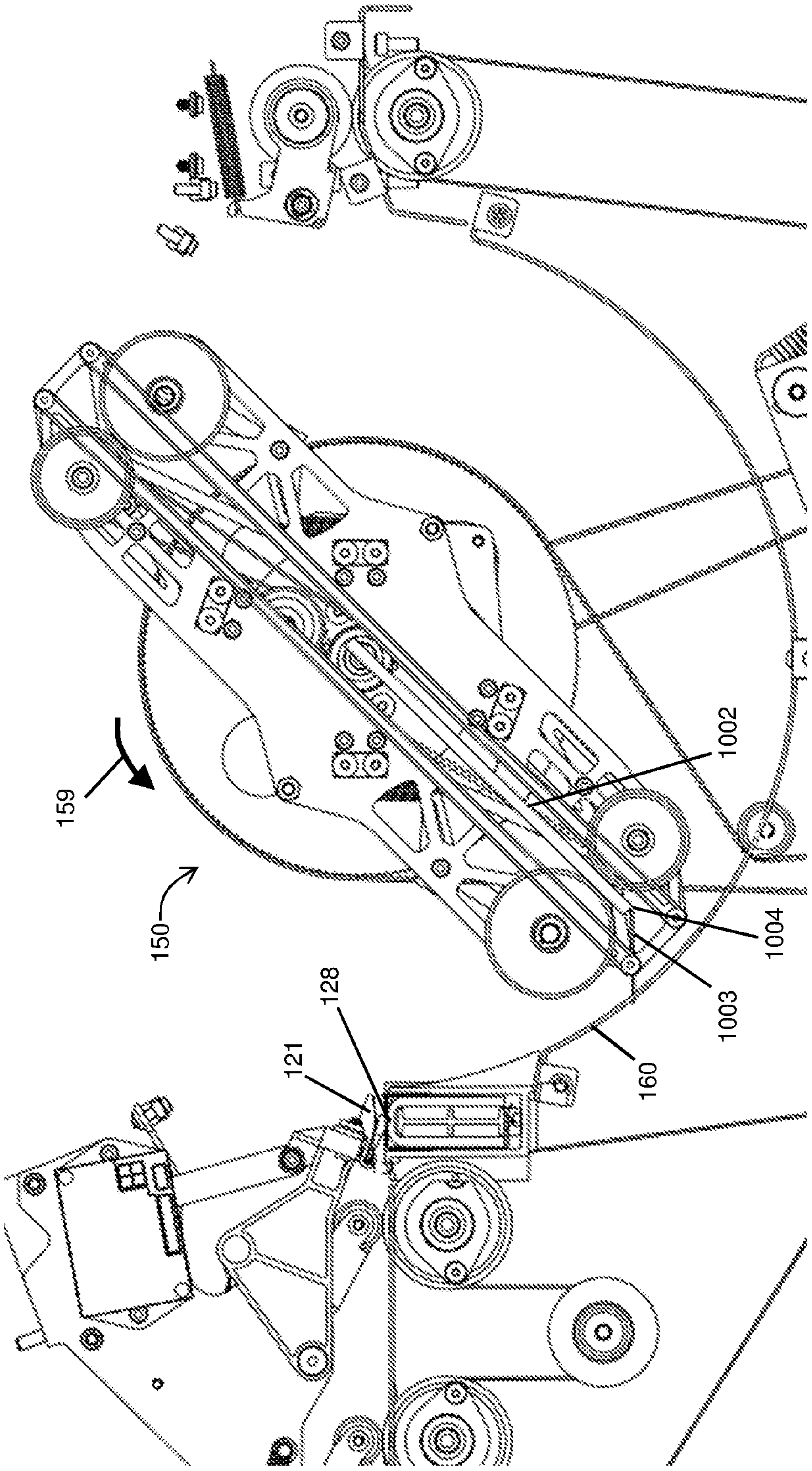

In FIG. 8, the flip cage continues rotating counter-clockwise as indicated by arrow 159. At this point, the flap 1003 has entirely left the moveable brush 121. The moveable brush 121 is now in contact with the moistening pad 125 at contact point 128 and is recharging with water for the next mail piece. In order to maintain proper water transfer from the moveable brush 121 to the flap of a mail piece, the superposition of motion of the nips and cage must keep the velocity at which the flap moves under the brush consistent. This keeps the time under the brush consistent which results in a consistent volume of water being deposited on to the flap for reliable sealing. It is also important to pull the flap from under the brush gently, so the flap doesn't flick upward spraying water when it becomes free of the brush.

After the flap leaves the brush, the semi-circular paper guide 160 under the flip cage 150 bends the flap 1003 to 90 degrees relative to the body 1002 of the envelope. The envelope crease line 1004 remains nearly aligned with the nip, and the flap bears against the semi-circular paper guide 160, causing the flap to bend at the crease line 1004. The semi-circular paper guide 160 keeps the flap 1003 in a bent position until the flip cage 150 completes a 180-degree rotation. Since the flip cage 150 and nip roller drives have a common axis of rotation, the cage transport nips motor will execute a motion profile during cage rotation to compensate for the relative motion of the flip cage, keeping the envelope radially stationary.

Figure 9:
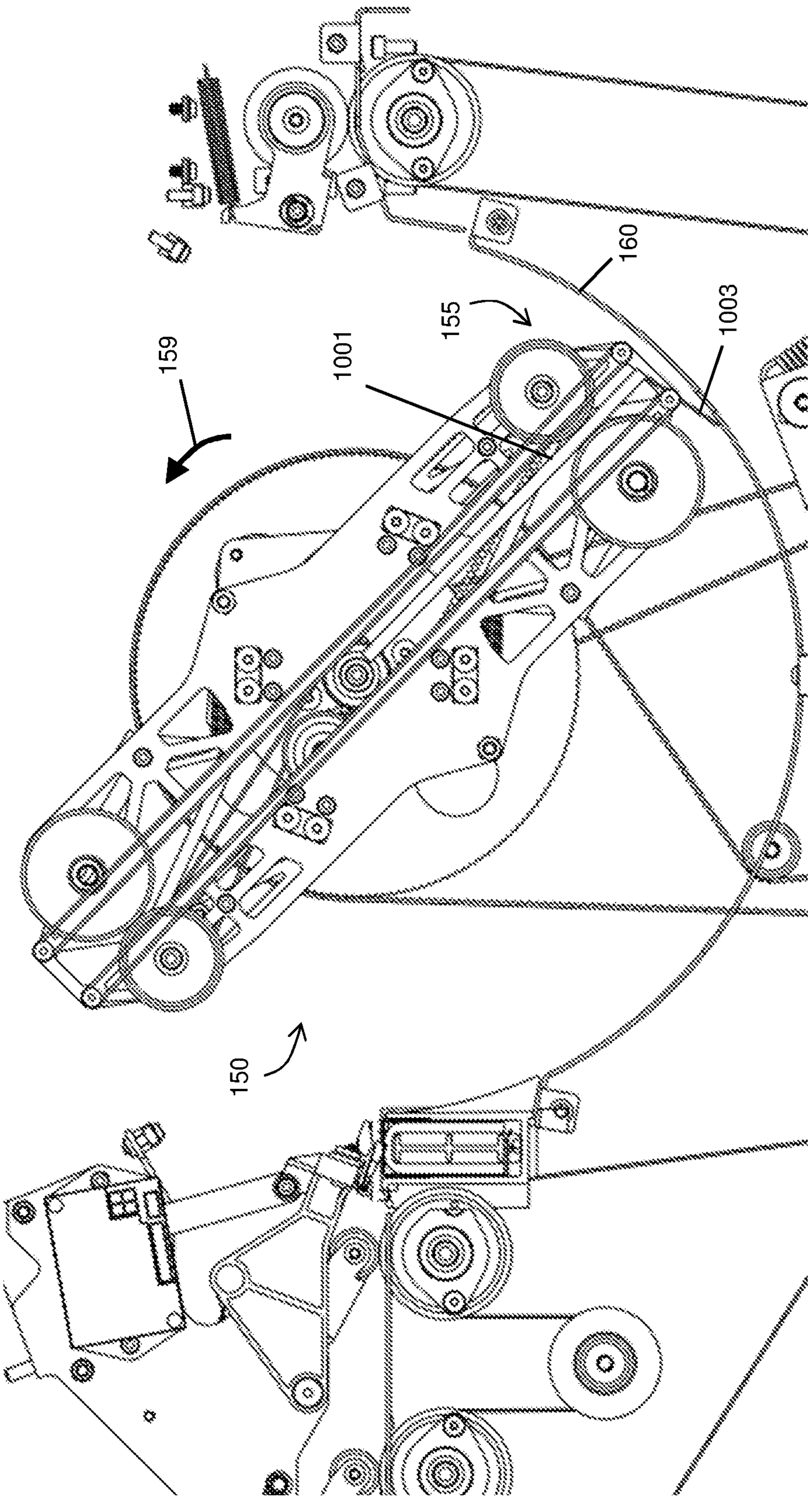

In FIG. 9, the flip cage continues rotating counter-clockwise as indicated by arrow 159 and the flap 1003 is bent at approximately 90 degrees by the paper guide 160.

Figure 10:
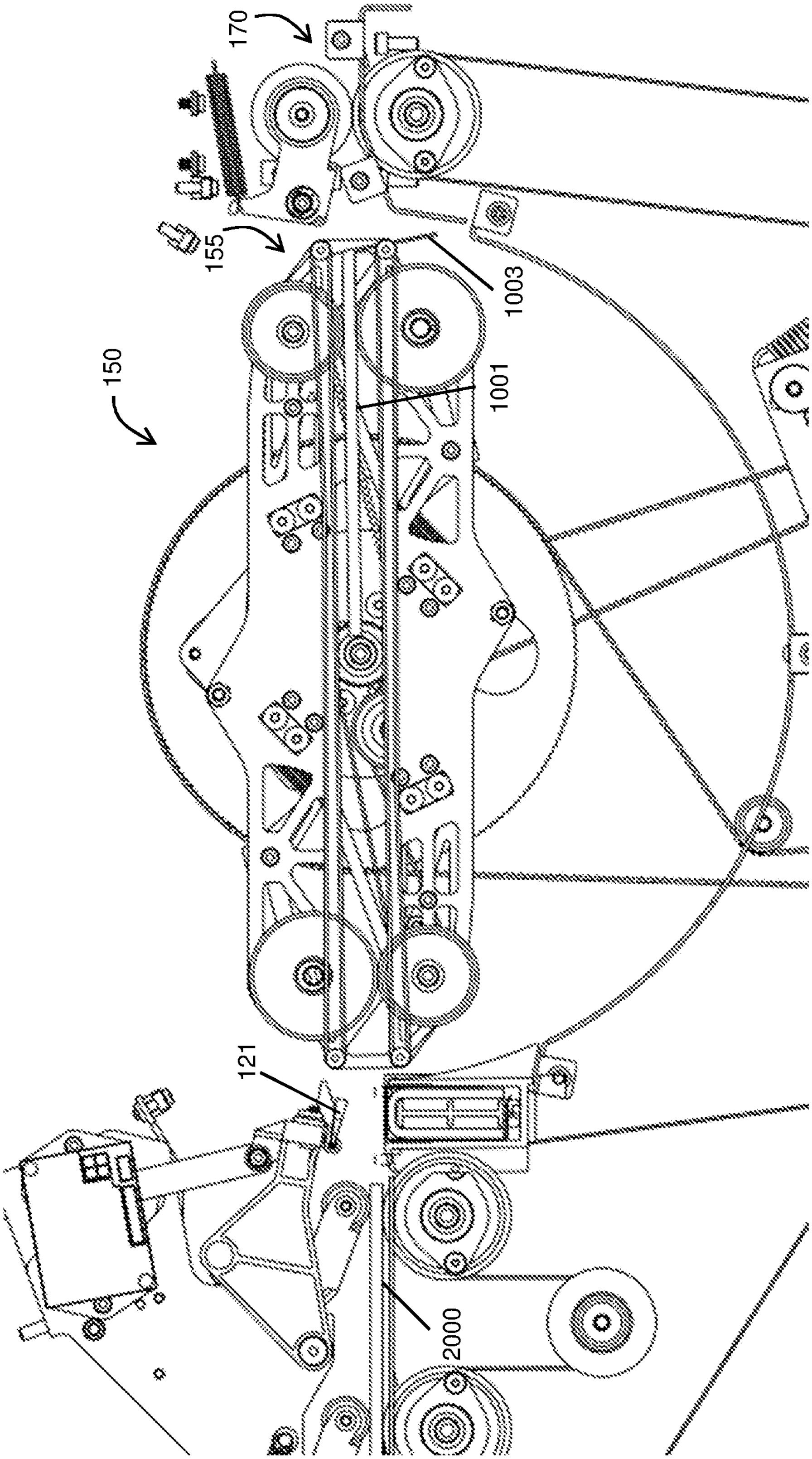

The flip cage 150 stops rotating once it reaches its home position, as shown in FIG. 10. Completion of the flip cage motion is shown in FIG. 22 at location H. Envelope 1001 is aligned with the sealer nip 170 formed by two compression rollers 172 and 173. When the flip cage 150 stops rotation, the flip cage nip rollers 155 transport the envelope into the sealer nip 170, which seals the flap 1003 against the body of the envelope. Commencement of this motion is shown in FIG. 22 at location I. It should be noted that the direction of the cage nip velocity is a function of the current orientation of the flip cage and reverses direction every other machine cycle. Meanwhile, the moveable brush 121 is moved back up to avoid contact with the body of the next oncoming mail piece 2000. The completed actuated brush up motion is shown in FIG. 22 at location J.

Figure 11:
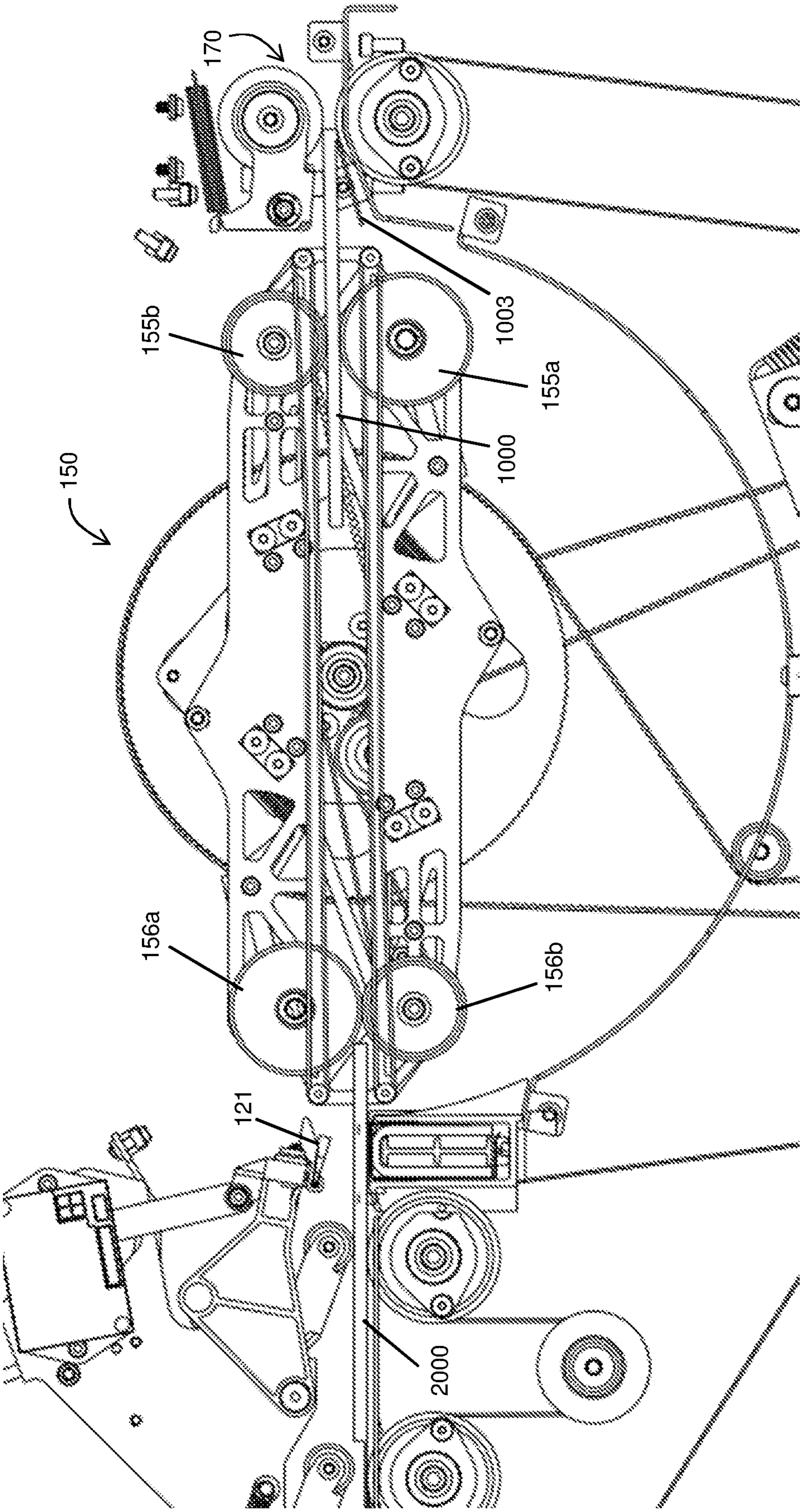
Figure 12:
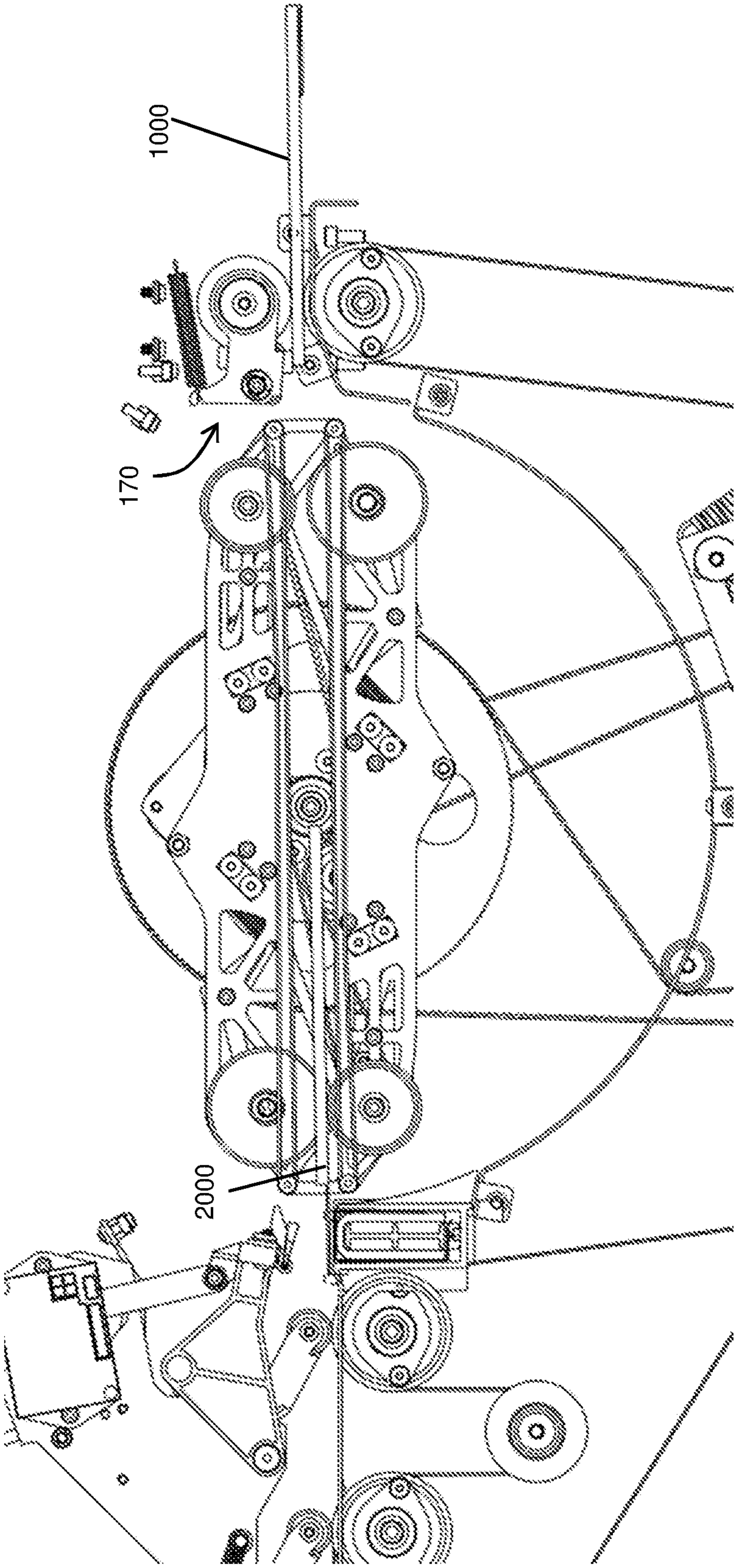

As shown in FIG. 11, as mail piece 1000 exits the flip cage, the paper guide 171 closes the flap 1003 before it enters the seal roller 170. Mail piece 2000 enters the flip cage 150 between nip rollers 156*a* and 156*b* as mail piece 1000 exits nip rollers 155*a* and 155*b*. As shown in FIG. 12, mail piece 1000 has been sealed by the sealer nip 170 and continues for further processing in downstream modules of the inserter system. Mail piece 2000 is now staged and ready to begin its flip and seal cycle. This process can proceed on a continuous cycle to seal the envelopes for any arbitrary number of mail pieces.

Figure 13:
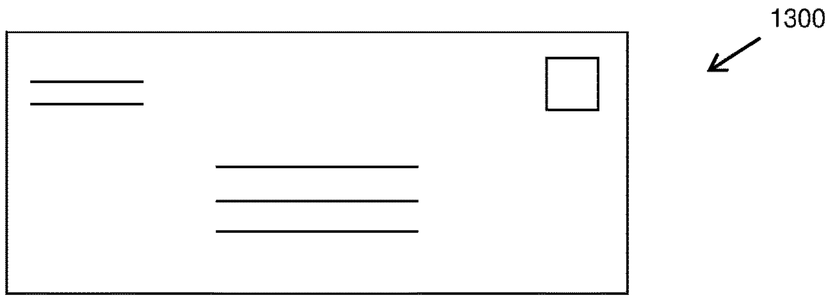
Figure 14:
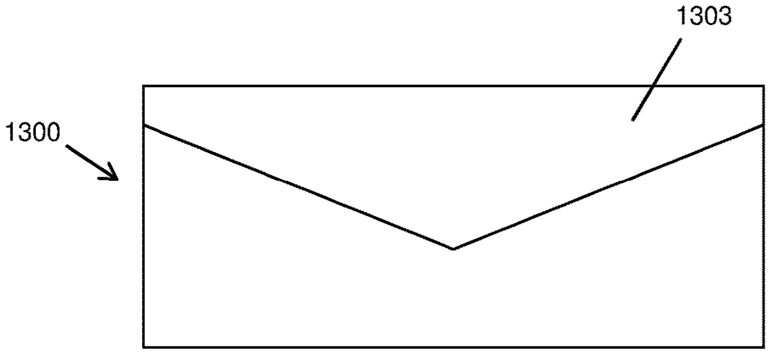

Different envelope sizes and configurations are known in the art. An example envelope 1300 for use with the invention is shown in FIGS. 13-14. Throughout the disclosure envelopes are referred to as being face-up or face-down. Face-up refers to an envelope with the address-side up, as shown in FIG. 13. Face-down refers to an envelope with the address-side down and its flap 1303 facing up, as shown in FIG. 14. Other envelope designs may require a flap to be in a different position than the standard envelope shown in FIGS. 13-14 and the skilled artisan would be able to make adjustments to the methods disclosed herein without undue experimentation, to allow the flipping and sealing devices of the invention to be compatible with such envelopes.

Figure 15:
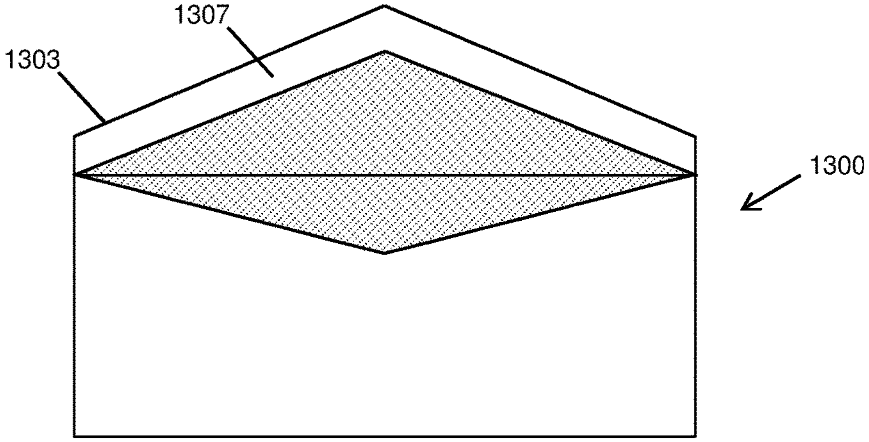

Continuing with the example, FIG. 15 shows the envelope 1300 is shown in a face-down orientation with the flap 1303 open such that the glue line 1307 is exposed and facing up. The configuration shown in FIG. 15 is generally the configuration of the envelope 1300 as it would enter the flip cage described herein, so that the moveable brush can contact the flap 1303 and wet the glue line 1307.

Figure 16:
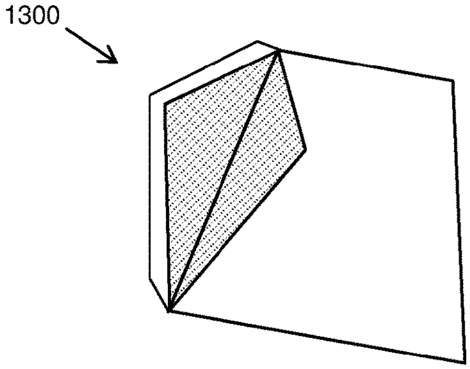
Figure 17:
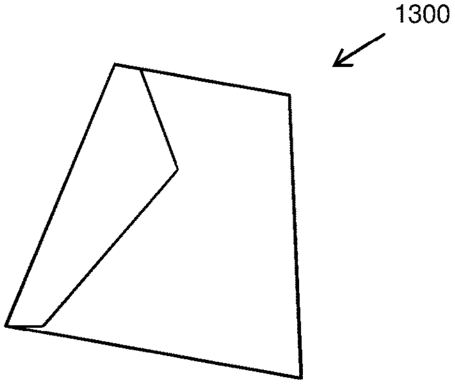

A perspective view of the envelope 1300 face-down in an open configuration is shown in FIG. 16. A perspective view of the envelope 1300 face-down in a closed configuration is shown in FIG. 17.

Figure 18:
Figure 19:
Figure 20:
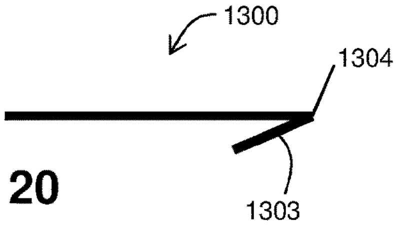
Figure 21:
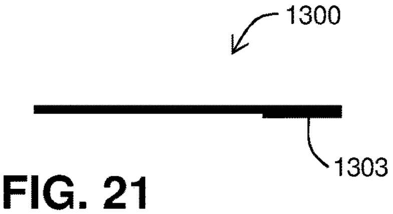

Side views of an envelope are shown in FIGS. 18-21. In FIG. 18 the envelope is face-down with the flap 1303 open. This is generally the configuration of the envelope as it enters the flip cage. In FIG. 19, the flap 1303 of the envelope 1300 is slightly bent at the crease line 1304. This is generally the configuration of the envelope as it is being rotated by the flip cage when the semi-circular paper guide begins to bend the flap. In FIG. 20, the envelope 1300 is in a face-up orientation with the flap 1303 folded over at the crease line 1304 at an acute angle such that the envelope 1300 is nearly sealed. This is generally the configuration of the envelope as it is being drawn into the sealer nip described above. In FIG. 21, the envelope is in a face-down sealed configuration, with the flap 1303 sealed against the body of the envelope. This is generally the configuration of the envelope after it has passed through the sealer nip.

The envelope sealing and flipping modules described above require several moving parts to operate with precision timing. To coordinate the movement of the entire machine cycle, the system is operably associated with a computer processor that controls the movement of the rollers and flip cage according to a set of timing instructions stored in a non-transitory memory. FIG. 22 illustrates an example timing diagram and associated mechanism velocity profiles for two entire machine cycles for visualizing the timing and movement of the moving parts of the systems described herein. The coordinated superposition of the cage rotation motor and the cage transport nips motor provides for reliable envelope sealing while the envelope is being flipped over to facilitate subsequent downstream mailing operations.

In FIG. 22, one machine cycle, according to the timing diagram example shown, takes 300 milliseconds. The total time available for the cage to flip is a function of the envelope size and number of cycles per hour (CPH), or envelopes per hour that the machine is processing. With a fixed brush to flap time and a variable total flip time, the cage rotation profile must compute the proper motion given the time remaining after the flap exits the brush. This profile must result in the exact 180-degree displacement within the machine cycle time constraint. When the flap has cleared the brush and the cage velocity is slewing at Vs, as shown in FIG. 22 location K, an intercept profile calculation is executed which yields a triangular velocity profile. This profile executes a configured displacement (to complete the remaining 180-degrees of cage rotation) in a configured amount of time (to complete a machine cycle). Since FIG. 22 is a velocity diagram, the total area under flip cage connected velocity segments from locations D to H down to the x-axis corresponds to 180 degrees of displacement.

The intercept profile can be computed such that the deceleration is equal to the acceleration. Substitution of the deceleration segment with a non-triangular SCCA (sine-constant-cosine-acceleration) profile is performed to decrease the magnitude of the jerk experienced by the flip cage at the beginning of the deceleration segment, while at peak velocity, and when coming to rest. This will minimize the vibration and noise generated by the flip cage assembly, which has a non-trivial mass, while operating at high throughput rates.

There are additional control attributes to the sealing algorithm. By positioning the envelope close or farther into the cage prior to rotation, the amount of water that is flicked off the flap during rotation can be minimized which could potentially get onto machine elements. In addition, the overall amount of water applied to the flap can be regulated by the amount of time the brush is in contact with the moistening pad in between envelope cycles.

Figure 23:
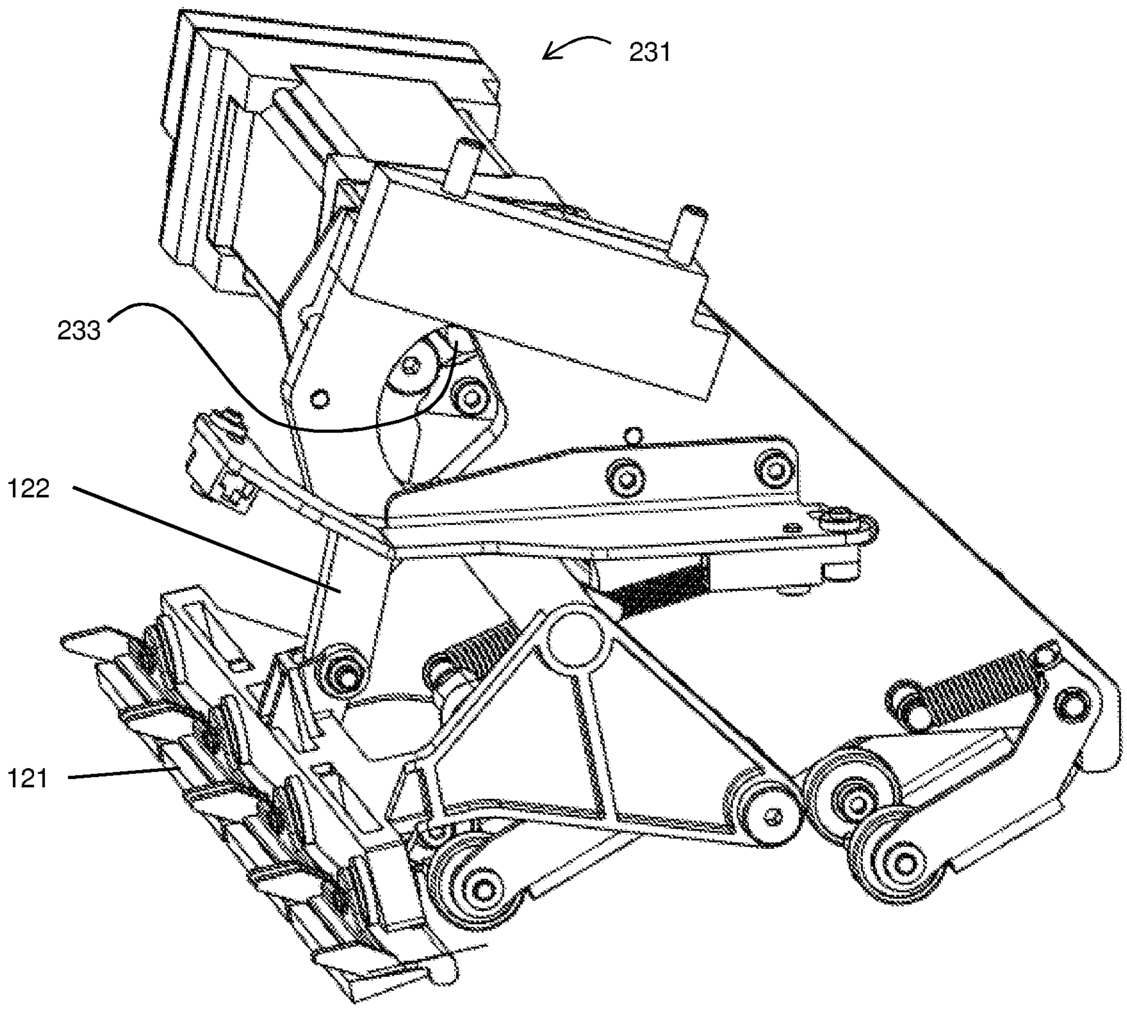
FIG. 23 shows the moveable brush actuated by a servomotor.

FIG. 23 illustrates a further aspect of the invention, whereby the brush assembly 230 can be actuated by a servomotor 231. In FIG. 23, the brush assembly 230 is shown in a rear perspective view, as compared to the front view of the brush assembly shown in FIG. 2. The servomotor 231 connects to the moveable brush 121 through linkage 233 and actuation arm 122. Applying a servomotor provides several advantages to the brush control compared with a conventional actuator design.

Figure 4:
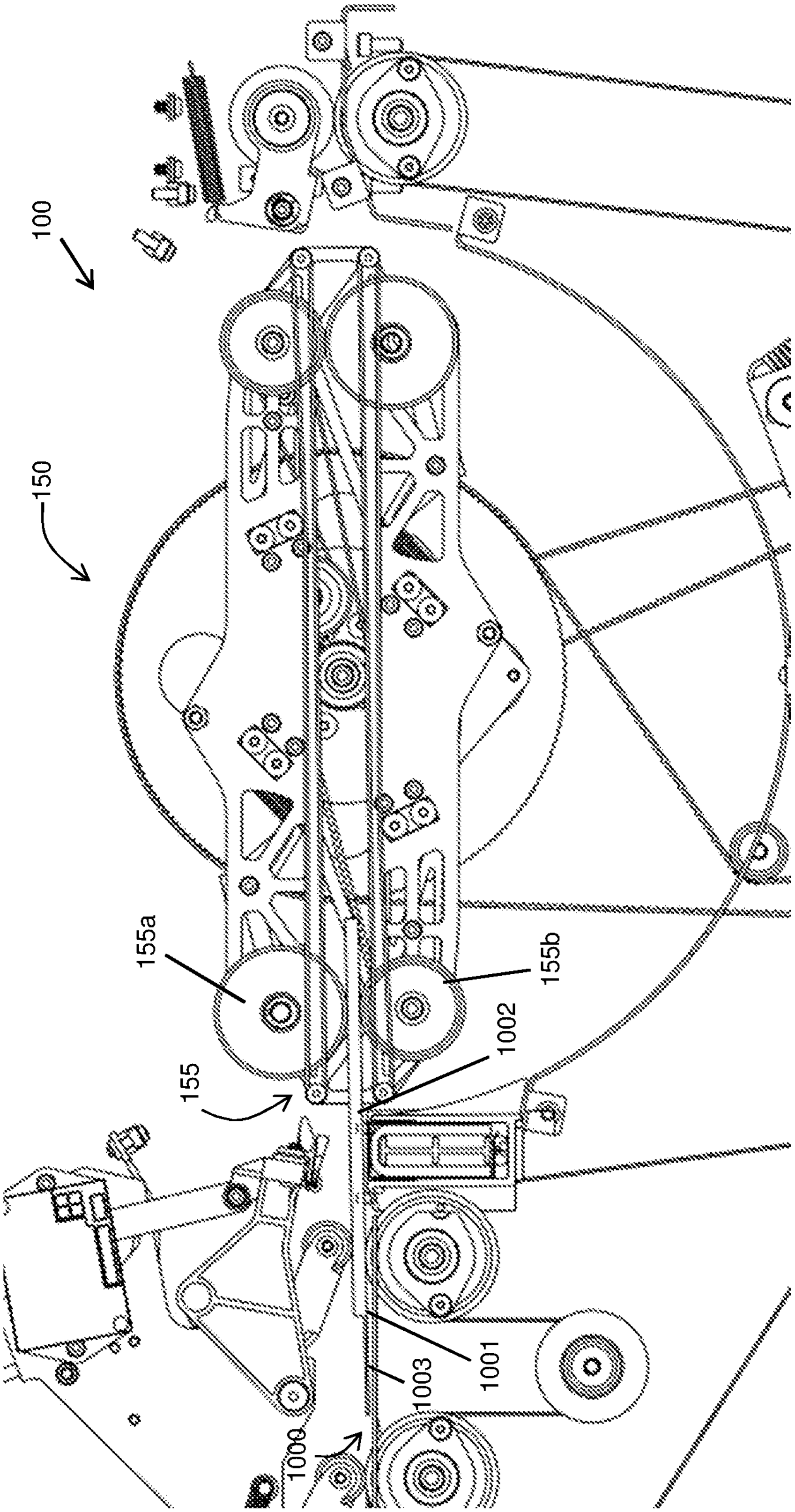

The servomotor configuration provides the ability to automatically set the brush contact height on the moistening pad by actuating the brush mechanism with the servomotor in an open loop mode. In open loop mode, encoder feedback is not used and a small constant current is applied to the motor windings so that the brush will move down to and rest against the moistening pad. For a DC servomotor, the amount of current applied is proportional to motor torque which is proportional to the force applied to the pad by the brush. Once the brush makes contact with the pad at the desired pre-determined force, the motor encoder position is recorded by the control system. The servomotor system is then returned to closed loop mode, which is normal operation, whereby motion profiles can now be commanded using encoder feedback for monitoring real-time position error. The brush would then be commanded to lift off the moistening pad to a known fixed displacement which corresponds to the brush home position, from the recorded position, as shown in FIG. 4. This technique allows for automatic homing of the brush mechanism and compensates for all mechanical tolerances in the mechanism assembly even as dimensional values change over time due to mechanical wear. Closed-loop servomotor control precisely and repeatably targets the envelope flap using the recorded encoder position, regardless speed of the machine. This construction minimizes the mechanism acceleration and softly decelerates the brush to rest to avoid water splashing and getting onto machine elements. It also provides the capability to dynamically adjust the upper position of the brush based on each individual inserted envelope thickness. Also, the brush can be elevated if a “no-seal” command is requested so that water is not applied to the flap of that designated envelope.

Based on the present description, the advantages of the disclosed configurations will be apparent to the person of ordinary skill in the art. For example, by combining the functions of sealing and turning over the mail piece, the flip cage design shortens the machine footprint for sealing and turnover functionality. Additionally, the entire glue line is wetted and is not interrupted for envelopes traveling in a long side-leading orientation. Moreover, the coordinated superposition of the cage rotation motor and the cage transport nips motor provides a constant linear velocity of the flap while it is in direct contact with the brush, which provides a consistent application of water volume deposited on each flap for reliable sealing.

The disclosed motion profiles provide additional advantages to the flip cage design. The intercept motion profile executes a configured displacement in a configured amount of time. The use of an intercept profile for the cage rotation axis guarantees that 180 degrees of axis rotation is completed in less than a known pre-calculated time that is less than the instantaneous machine cycle time. This guarantees that timing of turnover and sealing always satisfies inserter throughput requirements.

Substitution of a non-triangular SCCA profile for the deceleration segment of the intercept profile for the cage rotation minimizes the jerk at both the beginning of the deceleration segment and while coming to rest. This will minimize the vibration and noise generated by the flip cage assembly, which has a non-trivial mass, while operating at high throughput rates.

The overall amount of water applied to the flap can be regulated by the amount of time the brush is in contact with the water reservoir in between envelope cycles.

Use of a servomotor for the brush control provides several benefits including setting the brush height automatically, precisely and repeatably targeting the envelope flap, minimizing mechanism accelerations to minimize water splashing, dynamically adjusting the upper position of the brush based on each individual inserted envelope thickness, and the ability to elevate the brush in response to a no-seal command.

As described above, and as will be apparent to the person of ordinary skill in the art, the movement of the flip cage, the nip rollers, the moveable brush, the sealer nip rollers, and other moving parts of the disclosed systems must operate cooperatively to achieve a proper seal in one or more envelopes passing through the system. The operation and function of the various moving parts are driven by motors, as have been described above, and controlled by one or more computer processors operable to execute instructions.

One configuration of the mail inserter system described herein is shown in FIG. 1, which includes control system 14 configured to control the operation of individual modules including the sealing and flipping apparatus.

Monitoring and controlling various parameters can be performed using any type of computing device, such as a computer or programmable logic controller (PLC), that includes a processor, e.g., a central processing unit, or any combination of computing devices where each device performs at least part of the process or method. The control system 14 may employ software, hardware, firmware, hardwiring, or combinations of any of these. Features implementing functions can also be physically located at various positions, including being distributed such that portions of functions are implemented at different physical locations (e.g., inserter apparatus in one room and host workstation in another, or in separate buildings, for example, with wireless or wired connections).

Processors suitable for the execution of a computer program associated with control system 14, by way of example, include both general and special purpose microprocessors, and any one or more processor of any kind of digital computer. Generally, a processor associated with control system 14 will receive instructions and data from a read-only memory or a random access memory or both. Elements of computer are a processor for executing instructions and one or more memory devices for storing instructions and data. Generally, a computer will also include, or be operatively coupled to receive data from or transfer data to, or both, one or more non-transitory mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, solid state drive (SSD), and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

For a user to control and monitor the inserter systems and individual modules of the present invention, a user interface 19 is provided. The user interface 19 as shown in FIG. 1 can be located on the inserter system, or in embodiments it can be located remotely. The user interface can be a handheld device, e.g., a smart tablet, a smart phone, or a specialty device produced for the system. User interaction can be implemented on a computer having an I/O device, e.g., a CRT, LCD, LED, or projection device for displaying information to the user and an input or output device such as a keyboard and a pointing device, (e.g., a mouse or a trackball), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The control system 14 can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the control system can be interconnected through network by any form or medium of digital data communication, e.g., a communication network. Examples of communication networks include cell network (e.g., 3G or 4G), a local area network (LAN), and a wide area network (WAN), e.g., the Internet.

The control system 14 can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. The control system 14 can be implemented using instructions written in any suitable programming language known in the art, including, without limitation, C, C++, Perl, Java, ActiveX, HTML5, Visual Basic, or JavaScript.

A computer program for implementing the control system 14 does not necessarily correspond to a file. A program can be stored in a file or a portion of file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network. A file can be a digital file, for example, stored on a hard drive, SSD, CD, or other tangible, non-transitory medium. A file can be sent from one device to another over a network (e.g., as packets being sent from a server to a client, for example, through a Network Interface Card, modem, wireless card, or similar) Writing a file according to embodiments of the invention involves transforming a tangible, non-transitory, computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user. In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file are well-known in the art and, for example, can be invoked manually or automatically by a program or by a save command from software or a write command from a programming language.

Suitable computing devices typically include mass memory, at least one graphical user interface, at least one display device, and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD) or other optical storage, magnetic cassettes, magnetic tape, magnetic disk storage or other magnetic storage devices, Radiofrequency Identification tags or chips, or any other medium which can be used to store the desired information and which can be accessed by a computing device.

As one skilled in the art would recognize as necessary or best-suited for performance of the methods of the invention, a computer system or machines employed in embodiments of the invention may include one or more processors (e.g., a central processing unit (CPU) a graphics processing unit (GPU) or both), a main memory and a static memory, which communicate with each other via a bus.

Figure 24:
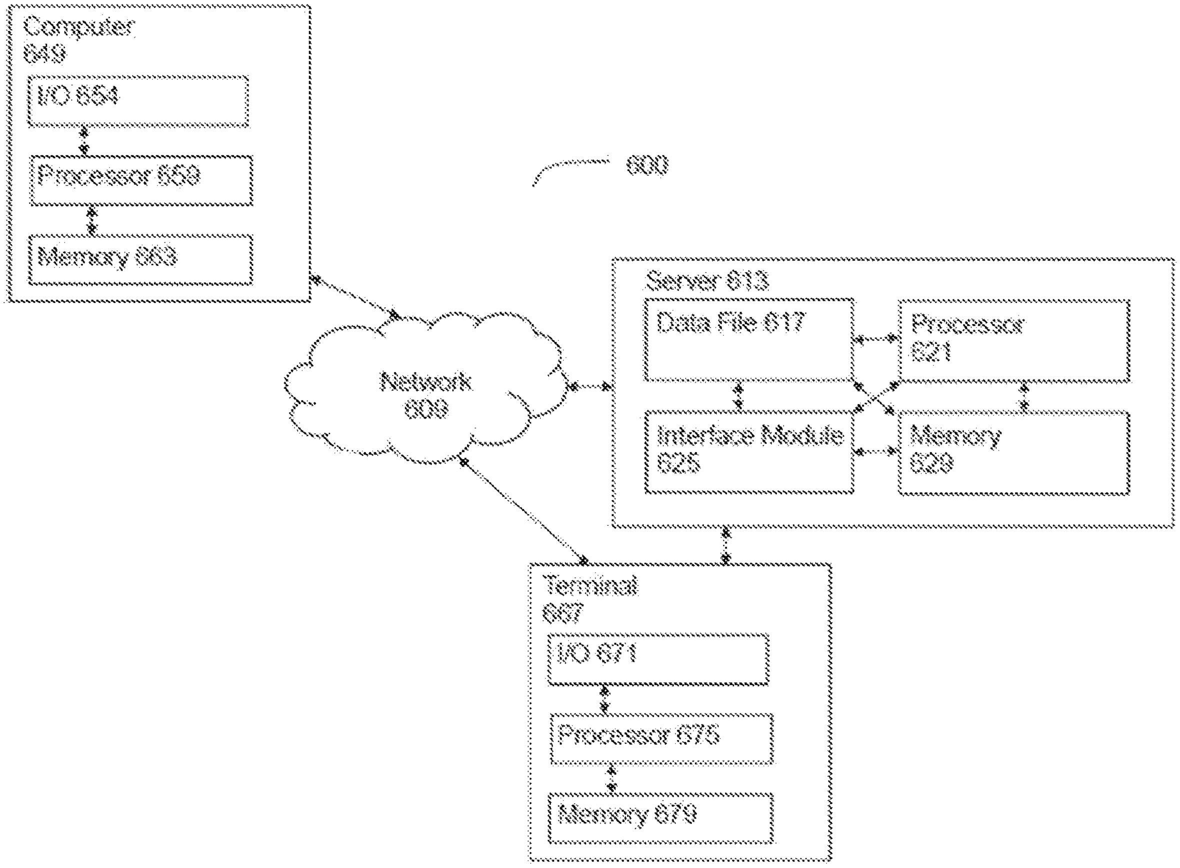
FIG. 24 shows a system architecture for use with the invention.

An example embodiment of the computer system architecture for implementing the control system 14 of the present invention is shown in FIG. 24. System 600 can include a computer 649 (e.g., laptop, desktop, or tablet). The computer 649 may be configured to communicate across a network 609. Computer 649 includes one or more processor 659 and memory 663 as well as an input/output mechanism 654. Where methods of the invention employ a client/server architecture, operations of methods of the invention may be performed using server 613, which includes one or more of processor 621 and memory 629, capable of obtaining data, instructions, etc., or providing results via interface module 625 or providing results as a file 617. Server 613 may be engaged over network 609 through computer 649 or terminal 667, or server 613 may be directly connected to terminal 667, including one or more processor 675 and memory 679, as well as input/output mechanism 671.

System 600 or machines according to example embodiments of the invention may further include, for any of I/O 649, 637, or 671 a video display unit (e.g., a liquid crystal display (LCD) or a cathode ray tube (CRT)). Computer systems or machines according to some embodiments can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Memory 663, 679, or 629 according to example embodiments of the invention can include a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system that combines wetting, flipping, and sealing of one or more envelopes, the system comprising:

an envelope receiving area configured to receive at least one of the envelopes;

a flip cage including a rigid frame mounted to one or more gears configured to rotate the flip cage about an axis, the flip cage comprising a first pair of nip rollers and a second pair of nip rollers located opposite the first pair of nip rollers, the flip cage configured to receive the at least one envelope from the envelope receiving area with a flap of the at least one envelope open and trailing such that the flap remains outside the flip cage;

a moveable brush assembly comprising a movable brush coupled to an actuation arm for automatically actuating the brush between at least a first position and a second position in response to operation of a servomotor operably coupled thereto, the brush configured to contact the flap of the at least one envelope while the at least one envelope is within the flip cage; and a sealer nip configured to press the flap against a body of the at least one envelope to form a seal between the flap and the body.

2. The system of claim 1 wherein the moveable brush is located in the envelope receiving area.

3. The system of claim 1 wherein at least one of the first and second pair of nip rollers of the flip cage is for receiving the at least one envelope from the envelope receiving area.

4. The system of claim 1 further comprising a curvilinear paper guide located beneath the rigid frame and configured to bear against the flap of the at least one envelope as the flip cage rotates about the axis.

5. The system of claim 1 wherein the sealer nip is positioned opposite the envelope receiving area.

6. The system of claim 5 wherein one of the first pair and second pair of nip rollers aligns with the envelope receiving area and the other one of the first pair and second pair of nip rollers aligns with the sealer nip.

7. The system of claim 1 wherein the one or more gears are operably connected to a cage rotation motor, and wherein at least one of the first pair and second pair of nip rollers is operably connected to a cage transport nips motor.

8. The system of claim 7 further comprising a control system for controlling the motors based on a programmable velocity profile.

9. The system of claim 8 wherein the velocity profile is adjustable to accommodate different sizes of the envelopes.

10. The system of claim 1 further comprising a moistening pad, the moveable brush configured to assume a first position with the moveable brush contacting the moistening pad and a second position with the moveable brush withdrawn from the moistening pad.

11. The system of claim 10 wherein the moveable brush is positioned with respect to the flip cage such that the moveable brush is aligned with the flap of the at least one envelope when that envelope is received and secured within at least one of the first pair and second pair of nip rollers.

12. The system of claim 11 wherein the moveable brush is operable to wet the flap of the at least one envelope.

* * * * *